US 6,684,732 B2

(12) United States Patent
Li

(10) Patent No.: US 6,684,732 B2
(45) Date of Patent: Feb. 3, 2004

(54) TOP HEAD SET SECURING DEVICE FOR BICYCLES

(76) Inventor: Mu-Rong Li, No. 146, Chingnian Rd., Tachia Chen, Taichung Hsien (TW)

( * ) Notice: Subject to any disclaimer, the term of this patent is extended or adjusted under 35 U.S.C. 154(b) by 0 days.

(21) Appl. No.: 10/098,564

(22) Filed: Mar. 18, 2002

(65) Prior Publication Data
US 2003/0172768 A1 Sep. 18, 2003

(51) Int. Cl.⁷ .............................................. B62K 21/12
(52) U.S. Cl. ...................... 74/551.1; 280/279; 384/513
(58) Field of Search ......................... 74/551.1–551.8; 280/272–279; 384/513; 188/24.11; 403/78

(56) References Cited

U.S. PATENT DOCUMENTS

| 5,201,242 A | * | 4/1993 | Chi | 74/551.1 |
| 5,291,797 A | * | 3/1994 | Chi | 74/551.1 |
| 5,445,047 A | * | 8/1995 | Chi | 74/551.1 |
| 5,540,457 A | * | 7/1996 | Johnson | 280/279 |
| 5,573,262 A | * | 11/1996 | Chi | 280/279 |
| 5,775,709 A | * | 7/1998 | Chen | 280/279 |
| 5,813,769 A | * | 9/1998 | Chueh | 384/513 |
| 6,039,499 A | * | 3/2000 | Chiang | 403/78 |
| 6,126,323 A | * | 10/2000 | Tange | 384/545 |
| 6,231,063 B1 | * | 5/2001 | Chi | 280/279 |
| 6,234,506 B1 | * | 5/2001 | Li | 280/279 |
| 6,422,353 B1 | * | 7/2002 | Lin | 188/24.11 |

FOREIGN PATENT DOCUMENTS

EP          1059226 A1 * 12/2000          ................. 280/279

* cited by examiner

Primary Examiner—Vinh T. Luong
(74) Attorney, Agent, or Firm—Rosenberg, Klein & Lee

(57) ABSTRACT

A top head set securing device includes a C-shaped pressing member connected to a lower end of a ring portion of a handlebar stem which clamps on a steerer tube extending through a head tube. Two lugs extend from two ends of the C-shaped pressing member for a bolt extending through the two lugs to securely clamp on the steerer tube. The pressing member has a tapered inner periphery which is mounted onto a tapered outer periphery of a pressing ring which is mounted to the steerer tube and rests on a top head set on a head tube. The pressing ring exerts a downward force to the head set when tightening the pressing member.

2 Claims, 7 Drawing Sheets

TOP HEAD SET SECURING DEVICE FOR BICYCLES

FIELD OF THE INVENTION

The present invention relates to a pressing member connected to a lower end of a handlebar stem which exerts a downward force to the pressing member which secures the head set on the head tube of a bicycle.

BACKGROUND OF THE INVENTION

A conventional connection between a handlebar 10, a head tube 16 and a head set 15 mounted on a top end of the head tube 16 is shown in FIG. 1 and the handlebar stem includes a ring portion 100 which is mounted to a steerer tube 17 extending through the head tube 16. The head set 15 is connected between the ring portion 100 and the head tube 16 so as to allow the handlebar 10 to control the turning of the steerer tube 17. A fastening set including two disks each have fastening wings 11 extending radially outward therefrom and the wings 11 contact the inside of the steerer tube 17. A bolt 13 threadedly extends in the central threaded passage 14 in the disks and expand the wings 11. A top cap 12 is connected to the bolt 13 and mounted on the top of the ring portion 100 so that the ring portion 100 and the steerer tube 17 are connected together. However, it requires a special tool to force the disks and the wings 11 in the steerer tube 17 and it is inconvenient to remove the disks and the wings 11 out from the seeter tube 17 when maintenance is needed.

SUMMARY OF THE INVENTION

In accordance with one aspect of the present invention, there is provided a top head set securing device and the device comprises a handlebar stem having a ring portion clamped onto a steerer tube and a C-shaped pressing member is connected to a lower end of the ring portion. Two lugs extend from two ends of the C-shaped pressing member and a bolt extends through the two lugs to pull the two lugs together. The pressing member has a tapered inner periphery and a pressing ring is mounted to the steerer tube and has a tapered outer periphery which is matched with the tapered inner periphery of the pressing member. The pressing ring presses onto the top head set on a head tube.

The primary object of the present invention is to provide a top head set securing device which is operated simply by screwing a bolt through a pressing member at the lower end of the ring portion of the handlebar stem.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
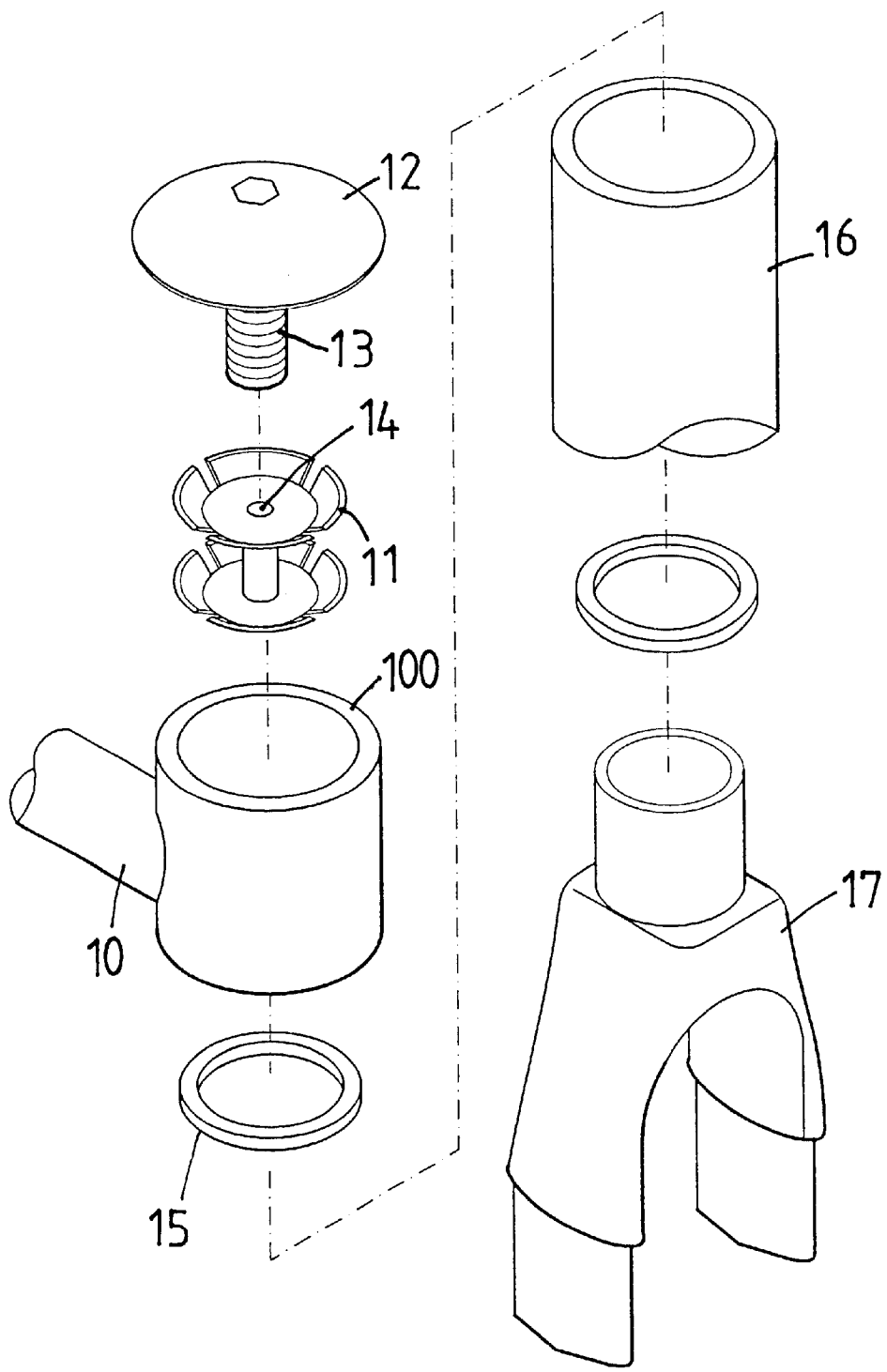
FIG. 1 is an exploded view to show a conventional way to secure the handlebar stem, the steerer tube and the head set.
Figure 2:
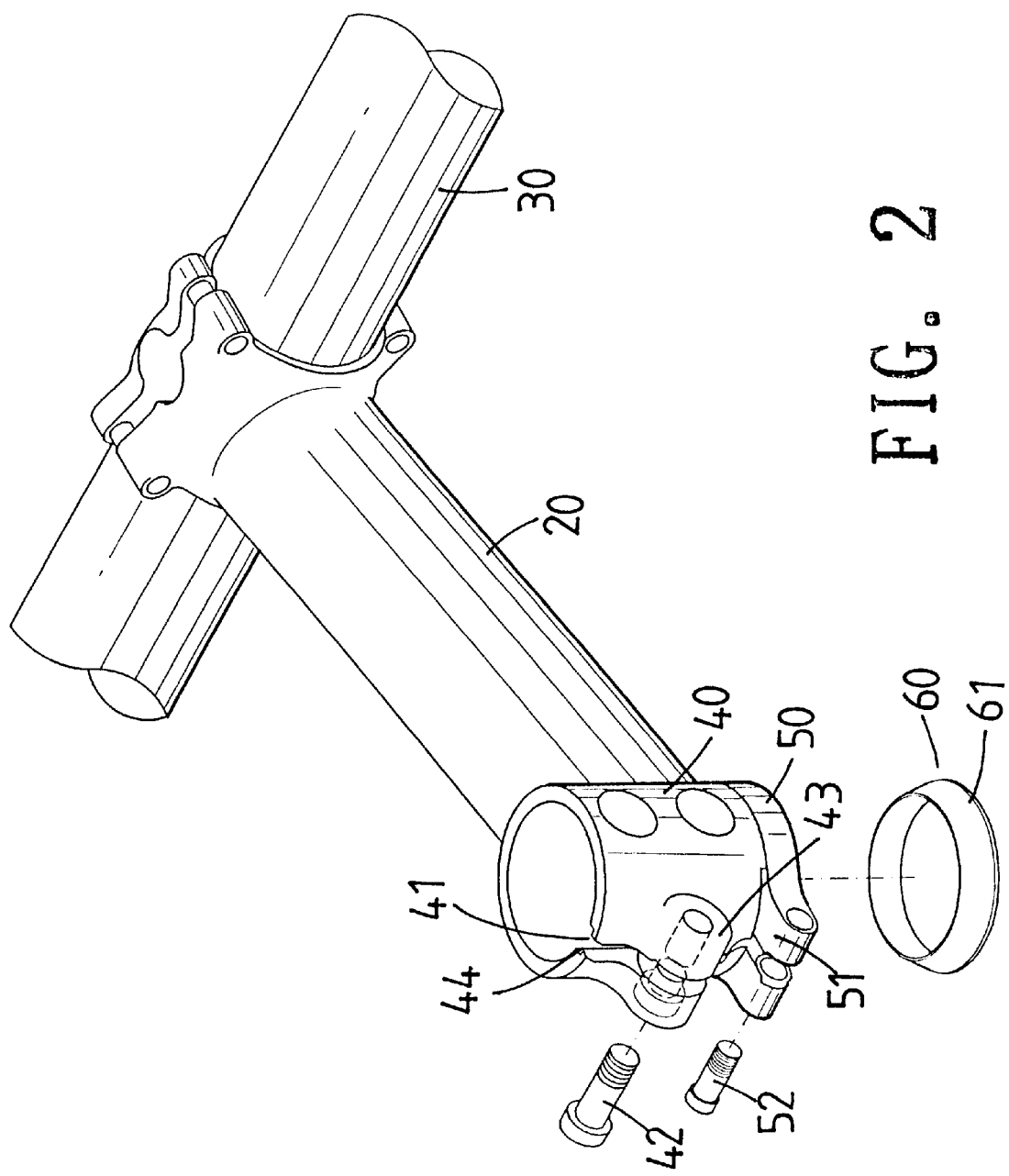
FIG. 2 is an exploded view to show a pressing member and the ring portion of the handlebar stem of the present invention.
Figure 3:
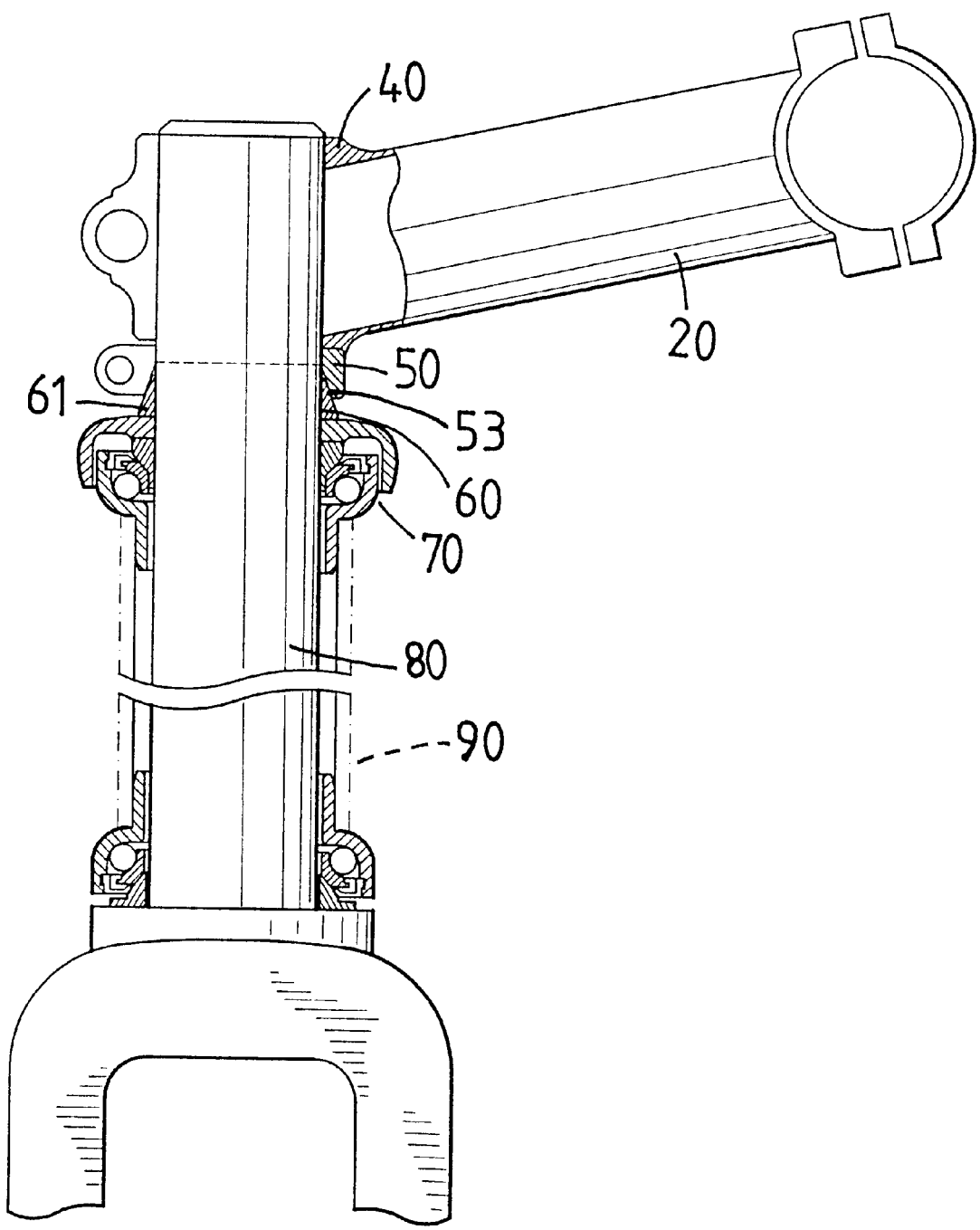
FIG. 3 shows a cross sectional view to show the engagement of the pressing member, the pressing ring, the top head set and the ring portion of the handlebar stem of the present invention.
Figure 4:
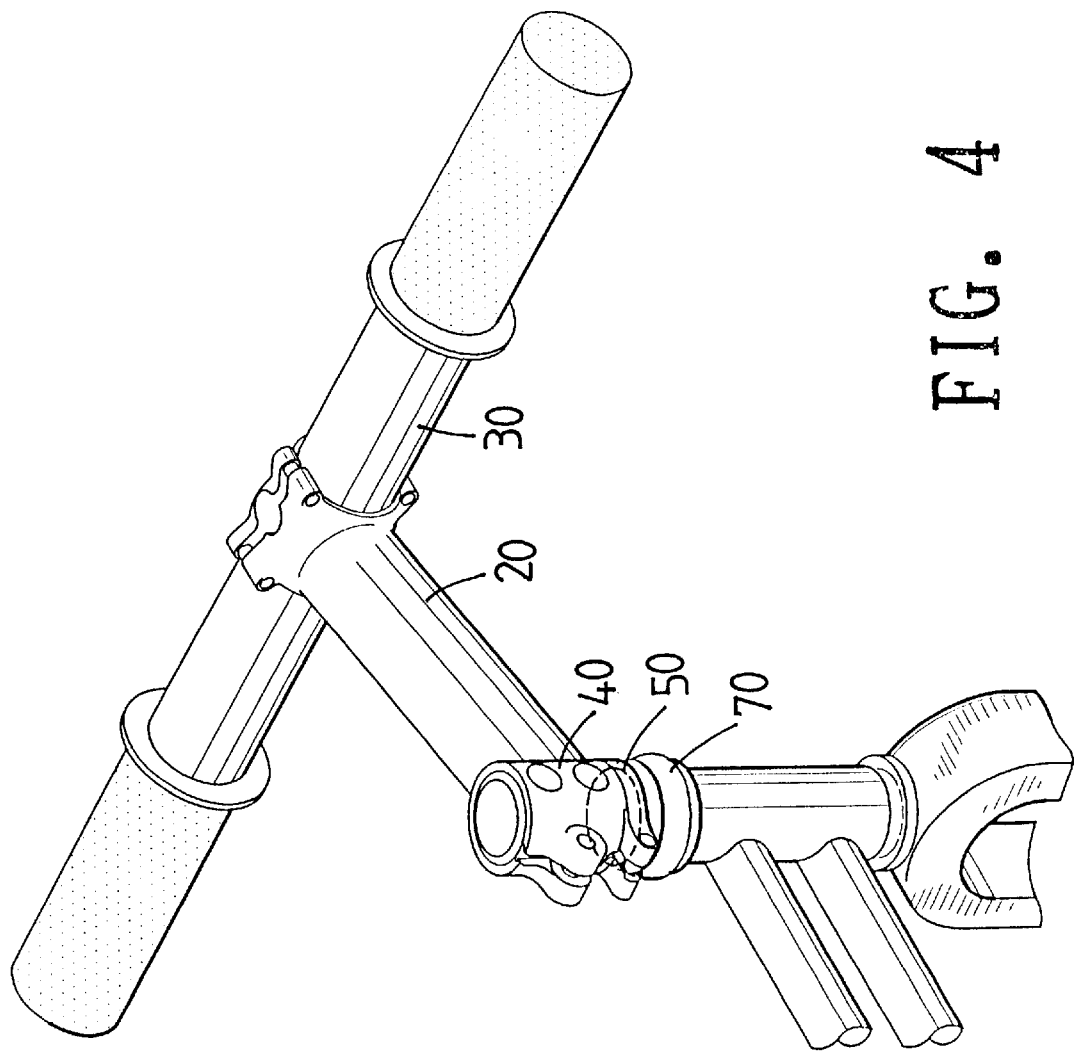
FIG. 4 is a perspective view to show the handlebar stem with the pressing member of the present invention connected to the steerer tube.

Referring to FIGS. 2 to 5, the top head set securing device of the present invention comprises a handlebar stem 20 with a ring portion 40 connected to a first end of the handlebar stem 20 and a handlebar 30 is connected to a second end of the handlebar stem 20. The ring portion 40 has a split 41 defined longitudinally in a wall thereof and two lugs 43 extend from the two edges defining the split 41. A bolt 42 threadedly extends through the two lugs on the ring portion 40 so as to securely mount onto a steerer tube 80 extending through a head tube 90 of a bicycle. A notch 44 (FIG. 8) is defined in an inner corner of each of the two edges defining the split 41 so that when the two lugs 43 are pulled close to each other, the notches 44 prevent the two edges of the split 41 from contacting each other.

A C-shaped pressing member 50 is connected to a lower end of the ring portion 40 and two lugs 51 extend from two ends of the C-shaped pressing member 50. A bolt 52 extends through the two lugs 51 to pull the two lugs 51 together. The pressing member 50 has a tapered inner periphery 53.

A pressing ring 60 is mounted to the steerer tube 80 and has a tapered outer periphery 61 which is matched with the tapered inner periphery 53 of the pressing member 50. The pressing ring 60 presses onto the top head set 70 on a head tube.

Figure 5A:
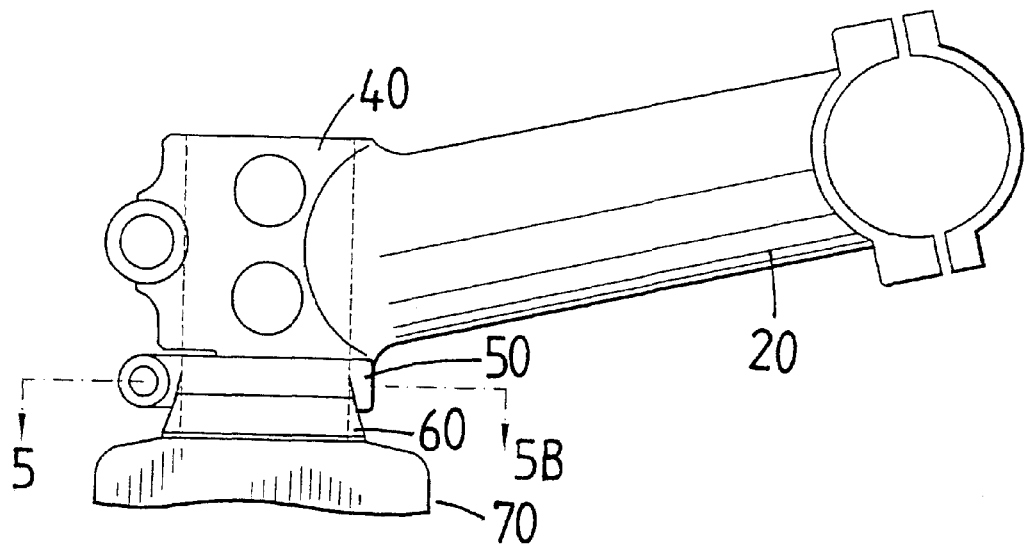
FIG. 5A shows that the pressing member of the present invention wherein the pressing member is not yet fastened.
Figure 5B:
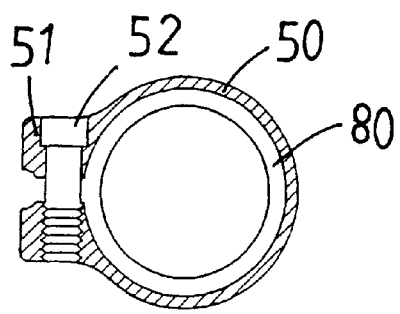
FIG. 5B is a cross sectional view, taken from the plane 5B—5B in FIG. 5A.
Figure 6A:
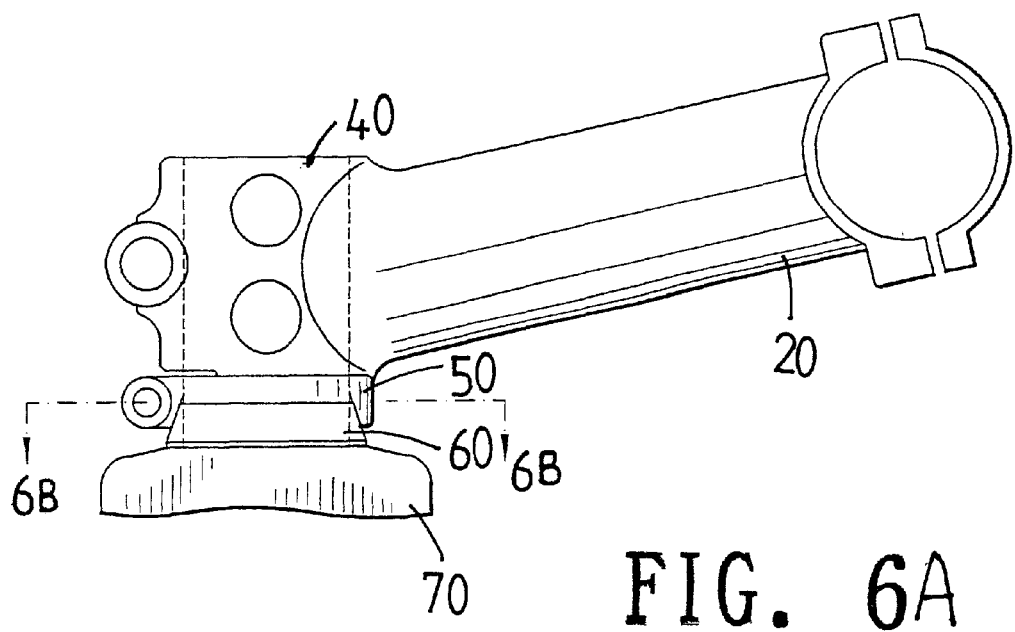
FIG. 6A shows that the pressing member of the present invention wherein the pressing member is fastened.
Figure 6B:
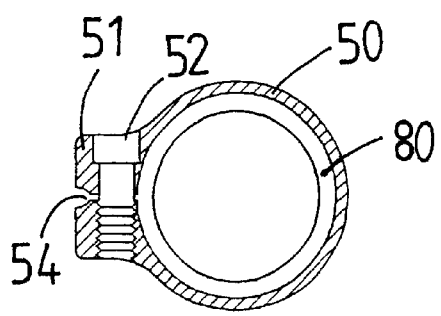
FIG. 6B is a cross sectional view, taken from the plane 6B—5B in FIG. 6A.
Figure 7:
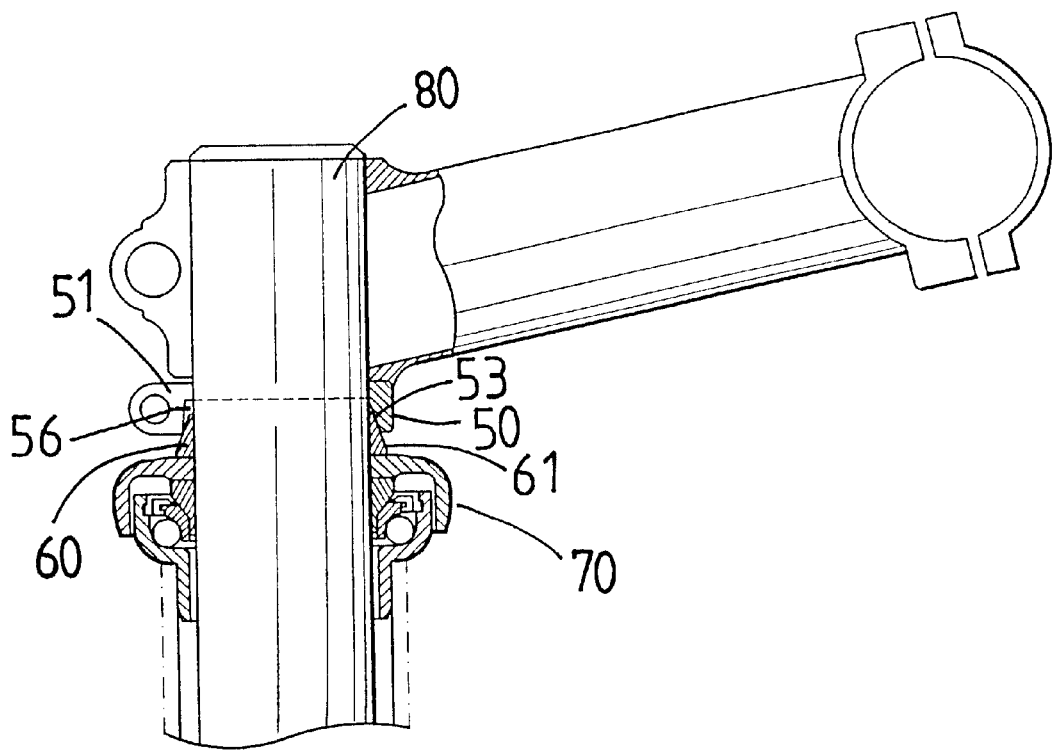
FIG. 7 shows that the tapered inner periphery of the pressing member has a recess defined therein.

When the bolt 52 does no yet fasten the two lugs 51 of the pressing member 50 together as shown in FIGS. 5A and 5B, the pressing ring 60 exerts no force on the top head set 70. As shown in FIGS. 6A and 6B, when the bolt 52 screws the two lugs 51 of the pressing member 50 together, the pressing ring 60 is pushed by the pressing member 50 and exerts a downward force on the top head set 70 to secure the top head set 70 in position. Therefore, the adjustment or maintenance for the whole assembly is convenient and can be proceeded without extra or special tools.

Figure 8:
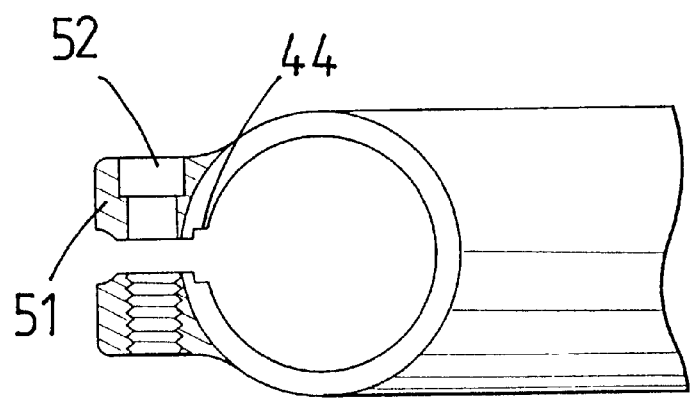
FIG. 8 shows a notch defined in an inner corner of each of the two edges defining the split of the ring portion of the handlebar stem.

FIG. 8 shows that the tapered inner periphery 53 of the pressing member 50 has a recess 56 defined therein and the recess 56 ensures the pressing member 50 pushes pressing ring 60 downward.

While we have shown and described the embodiment in accordance with the present invention, it should be clear to those skilled in the art that further embodiments may be made without departing from the scope of the present invention.

What is claimed is:

1. A top head set securing device comprising:

a handlebar stem with a ring portion which has a split defined longitudinally in a wall thereof and two lugs extend from the two edges defining the split, the ring portion connected to a first end of the handlebar stem, a bolt threadedly extending through the two lugs on the ring portion so as to be adapted to clamp a steerer tube, a notch defined in an inner corner of each of the two edges defining the split, a C-shaped pressing member connected to a lower end of the ring portion, two lugs extending from two ends of the C-shaped pressing member to pull the two lugs together, the pressing member having a tapered inner periphery, and a pressing ring adapted to be mounted to the steerer tube and having a tapered outer periphery which is matched with the tapered inner periphery of the pressing member, the pressing ring adapted to press onto a top head set on a head tube.

2. The device as claimed in claim 1, wherein the tapered inner periphery of the pressing member has a recess defined therein.

\* \* \* \* \*